United States Patent Office 2,861,001
Patented Nov. 18, 1958

2,861,001
GLASS COMPOSITION

Guy E. Rindone, State College, Pa., assignor to Prismo Safety Corporation, Huntingdon, Pa., a corporation of Pennsylvania No Drawing. Application August 27, 1956
Serial No. 606,214

11 Claims. (Cl. 106—53)

The present invention relates to glass compositions having a high index of refraction and, more particularly, to glass compositions suitable for making small glass beads for use as retroreflective elements.

Painted highway markings and signs have been made strikingly visible to night time motorists by including small transparent glass beads in the paint layer. These tiny particles, in conjunction with the reflective pigment of the paint, act to reflect the incident light from the headlights back toward its source and thus make the painted area visible to the motorist.

To be effective for such use, the beads must have certain properties. They must have a fairly high refractive index, be transparent, resistant to weathering, and have great chemical stability. In the past, beads having a refractive index in the neighborhood of 1.55 or even lower, have been used. More recently, beads having a refractive index of at least 1.60 and in the range of 1.65–1.70 have been proposed.

It has often been observed in the past that glasses having high refractive indices are not chemically stable in relation to atmospheric attack.

It is an object of the present invention to provide novel compositions of glass which have high indices of refraction.

It is a further object of the present invention to provide novel compositions of glass which have indices of refraction over 1.90 and still have good chemical stability.

It is a still further object of the present invention to provide novel glass compositions for making glass beads suitable for the reflectorizing of highway paints and signs.

A still further object of the present invention is to provide novel compositions of glass suitable for reflectorizing highway paints and signs that may be used indefinitely without surface deterioration, even in industrial areas where acid fumes are present in the atmosphere.

These and other objects of the invention are accomplished by the following invention, wherein a glass having an index of refraction of over 1.90, which is chemically stable to weathering, is produced which contains silicon dioxide, titanium dioxide, barium oxide, lead oxide, and an appreciable amount of at least one of the following ingredients: arsenic oxide and antimony oxide.

It has been found that the addition to silicate glasses containing titanium dioxide, barium oxide and lead oxide of large proportions of arsenic oxide and/or antimony oxide yield glasses with indices of refraction above 1.90. The addition of arsenic oxide and/or antimony oxide improves the meltability leading to better glasses in shorter times and at lower temperatures. In addition, the color of the glasses becomes lighter as these materials are introduced.

On slow cooling these glass compositions devitrify completely. However, rapid quenching prevents devitrification and produces transparent particles. Quenching the molten glass in water, as is the usual practice, is sufficient to produce transparent glass particles. Liquid droplets formed by passing crushed and graded particles of the glass through a flame or a radiant-heat stack, may be quenched to provide spherical transparent beads.

The following example illustrates the preferred composition ranges:

Example 1

| | Mol percent |
|---|---|
| $SiO_2$ | 11.9–26.9 |
| $TiO_2$ | 20.1–40.1 |
| BaO | 15.7–20.7 |
| PbO | 7.3–12.3 |
| $AsO_{1.5}$ | 0–15 |
| $SbO_{1.5}$ | 0–15 | where the total of $AsO_{1.5}$ and $SbO_{1.5}$ is greater than 2.5 mol percent but not more than 15 mol percent.

Additional examples of specific compositions are as follows:

Example 2

| | Mol percent |
|---|---|
| $SiO_2$ | 16.9 |
| $TiO_2$ | 40.1 |
| BaO | 20.7 |
| PbO | 12.3 |
| $SbO_{1.5}$ | 10.0 |
| | 100 |

The batch composition for this glass was:

| | Gms. |
|---|---|
| $SiO_2$ | 4.1 |
| $TiO_2$ | 48.0 |
| $Ba(NO_3)_2$ | 82.2 |
| $PbO \cdot SiO_2$ | 52.2 |
| $Sb_2O_3$ | 22.6 |

The index of refraction was above 2.00.

Example 3

| | Mol percent |
|---|---|
| $SiO_2$ | 26.9 |
| $TiO_2$ | 40.1 |
| BaO | 15.7 |
| PbO | 12.3 |
| $SbO_{1.5}$ | 5.0 |
| | 100 |

The batch composition for this glass was:

| | Gms. |
|---|---|
| $SiO_2$ | 13.2 |
| $TiO_2$ | 48.0 |
| $Ba(NO_3)_2$ | 62.2 |
| $PbO.SiO_2$ | 52.2 |
| $Sb_2O_3$ | 13.3 |

The index of refraction was above 2.00.

Example 4

| | Mol percent |
|---|---|
| $SiO_2$ | 16.9 |
| $TiO_2$ | 40.1 |
| BaO | 20.7 |
| PbO | 12.3 |
| $AsO_{1.5}$ | 5.0 |
| $SbO_{1.5}$ | 5.0 |
| | 100 |

The batch composition for this glass was:

| | Gms. |
|---|---|
| $SiO_2$ | 4.1 |
| $TiO_2$ | 48.0 |
| $Ba(NO_3)_2$ | 82.2 |
| $PbO.SiO_2$ | 52.2 |
| $Sb_2O_3$ | 13.3 |
| $As_2O_3$ | 9.0 |

The index of refraction was above 2.00.

Example 5

|  | Mol percent |
|---|---|
| $SiO_2$ | 11.9 |
| $TiO_2$ | 40.1 |
| BaO | 20.7 |
| PbO | 12.3 |
| $SbO_{1.5}$ | 15.0 |

The batch composition for this glass was:

|  | Gms. |
|---|---|
| $SiO_2$ | 13.2 |
| $TiO_2$ | 36.0 |
| $Ba(NO_3)_2$ | 82.2 |
| $PbO.SiO_2$ | 52.2 |
| $Sb_2O_3$ | 22.6 |

The index of refraction was above 2.00.

Example 6

|  | Mol percent |
|---|---|
| $SiO_2$ | 11.9 |
| $TiO_2$ | 40.1 |
| BaO | 20.7 |
| PbO | 12.3 |
| $AsO_{1.5}$ | 15.0 |
|  | 100 |

The batch composition for this glass was:

|  | Gms. |
|---|---|
| $TiO_2$ | 48.0 |
| $Ba(NO_3)_2$ | 82.2 |
| $PbO.SiO_2$ | 52.2 |
| $As_2O_3$ | 27.0 |

The index of refraction of this glass was above 2.00.

Example 7

|  | Mol percent |
|---|---|
| $SiO_2$ | 21.9 |
| $TiO_2$ | 40.1 |
| BaO | 20.7 |
| PbO | 7.3 |
| $AsO_{1.5}$ | 10.0 |
|  | 100 |

The batch composition for this glass was:

|  | Gms. |
|---|---|
| $SiO_2$ | 13.2 |
| $TiO_2$ | 30.1 |
| $Ba(NO_3)_2$ | 82.2 |
| $PbO.SiO_2$ | 52.2 |
| $As_2O_3$ | 27.0 |

The index of refraction was between 1.99 and 2.00.

Each of these batches melted readily at temperatures of 1250° to 1350° C. and when quenched rapidly in water formed clear glasses suitable for use in manufacturing spheres. The small transparent glass beads or spheres may be produced from these compositions by suspending small particles of the glass in air at moderately high temperatures for a brief time and then quickly cooling. Whereas much larger masses having these compositions would either crack or devitrify, small spheres can be successfully prepared by such methods in the form of clear, transparent, substantially colorless, weather-resistant and traffic-resistant beads.

It will be obvious to those skilled in the art that various changes may be made without departing from the spirit of the invention and therefore the invention is not limited to what is described in the specification, but only as indicated in the appended claims.

What is claimed is:

1. Transparent, weather-resistant small glass beads having a refractive index over 1.90 and a composition consisting of the following ingredients in the mol percents indicated:

| $SiO_2$ | 11.9–26.9 |
|---|---|
| $TiO_2$ | 20.1–40.1 |
| BaO | 15.7–20.7 |
| PbO | 7.3–12.3 |
| $AsO_{1.5}$ | Up to 15 |
| $SbO_{1.5}$ | Up to 15 | wherein the mol percent of $AsO_{1.5}$ plus $SbO_{1.5}$ is between 2.5 and 15.

2. Transparent, weather-resistant small glass beads having a refractive index over 1.90 and a composition consisting of the following ingredients in the mol percents indicated:

| $SiO_2$ | 11.9–26.9 |
|---|---|
| $TiO_2$ | 20.1–40.1 |
| BaO | 15.7–20.7 |
| PbO | 7.3–12.3 |
| $AsO_{1.5}$ | 2.5–15 |

3. Transparent, weather-resistant small glass beads having a refractive index over 1.90 and a composition consisting of the following ingredients in the mol percents indicated:

| $SiO_2$ | 11.9–26.9 |
|---|---|
| $TiO_2$ | 20.1–40.1 |
| BaO | 15.7–20.7 |
| PbO | 7.3–12.3 |
| $SbO_{1.5}$ | 2.5–15 |

4. Transparent, weather-resistant small glass beads having a refractive index over 1.90 and a composition consisting of the following ingredients in the mol percents indicated.

| $SiO_2$ | 11.9–26.9 |
|---|---|
| $TiO_2$ | 20.1–40.1 |
| BaO | 15.7–20.7 |
| PbO | 7.3–12.3 |
| $AsO_{1.5}$ | 2.5–15 |
| $SbO_{1.5}$ | Up to 12.5 |

5. Transparent, weather-resistant small glass beads having a refractive index over 1.90 and a composition consisting of the following ingredients in the mol percents indicated:

| $SiO_2$ | 11.9–26.9 |
|---|---|
| $TiO_2$ | 20.1–40.1 |
| BaO | 15.7–20.7 |
| PbO | 7.3–12.3 |
| $AsO_{1.5}$ | Up to 12.5 |
| $SbO_{1.5}$ | 2.5–15 |

6. Transparent, weather-resistant small glass beads having a refractive index over 1.90 and a composition of the following mol percent:

| $SiO_2$ | 16.9 |
|---|---|
| $TiO_2$ | 40.1 |
| BaO | 20.7 |
| PbO | 12.3 |
| $SbO_{1.5}$ | 10.0 |

7. Transparent, weather-resistant small glass beads having a refractive index over 1.90 and a composition of the following mol percent:

| $SiO_2$ | 26.9 |
|---|---|
| $TiO_2$ | 40.1 |
| BaO | 15.7 |
| PbO | 12.3 |
| $SbO_{1.5}$ | 5.0 |

8. Transparent, weather-resistant small glass beads having a refractive index over 1.90 and a composition of the following mol percent:

| | |
|---|---|
| $SiO_2$ | 16.9 |
| $TiO_2$ | 40.1 |
| $BaO$ | 20.7 |
| $PbO$ | 12.3 |
| $AsO_{1.5}$ | 5.0 |
| $SbO_{1.5}$ | 5.0 |

9. Transparent, weather-resistant small glass beads having a refractive index over 1.90 and a composition of the following mol percent:

| | |
|---|---|
| $SiO_2$ | 11.9 |
| $TiO_2$ | 40.1 |
| $BaO$ | 20.7 |
| $PbO$ | 12.3 |
| $SbO_{1.5}$ | 15.0 |

10. Transparent, weather-resistant small glass beads having a refractive index over 1.90 and a composition of the following mol percent:

| | |
|---|---|
| $SiO_2$ | 11.9 |
| $TiO_2$ | 40.1 |
| $BaO$ | 20.7 |
| $PbO$ | 12.3 |
| $AsO_{1.5}$ | 15.0 |

11. Transparent, weather-resistant small glass beads having a refractive index over 1.90 and a composition of the following mol percent:

| | |
|---|---|
| $SiO_2$ | 21.9 |
| $TiO_2$ | 40.1 |
| $BaO$ | 20.7 |
| $PbO$ | 7.3 |
| $AsO_{1.5}$ | 10.0 |

References Cited in the file of this patent

UNITED STATES PATENTS

| | | |
|---|---|---|
| 2,313,685 | Touby | Mar. 9, 1943 |
| 2,523,264 | Armistead | Sept. 26, 1950 |
| 2,577,627 | Pincus | Dec. 4, 1951 |
| 2,771,375 | Foraker | Nov. 20, 1956 |

FOREIGN PATENTS

| | | |
|---|---|---|
| 719,067 | France | Nov. 13, 1931 |
| 683,544 | Great Britain | Dec. 3, 1952 |